(12) United States Patent
Mahmood et al.

(10) Patent No.: US 11,859,583 B2
(45) Date of Patent: Jan. 2, 2024

(54) FUEL INJECTOR HAVING DUAL SOLENOID CONTROL VALVES

(71) Applicant: Caterpillar Inc., Peoria, IL (US)

(72) Inventors: Sana Mahmood, Albuquerque, NM (US); Robert M. Campion, Chillicothe, IL (US); Lifeng Wang, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 49 days.

(21) Appl. No.: 17/327,851

(22) Filed: May 24, 2021

(65) Prior Publication Data

US 2021/0277856 A1    Sep. 9, 2021

Related U.S. Application Data

(62) Division of application No. 15/847,301, filed on Dec. 19, 2017, now Pat. No. 11,035,332.

(51) Int. Cl.
*F02M 51/06* (2006.01)
*F02M 61/04* (2006.01)
(Continued)

(52) U.S. Cl.
CPC ........ *F02M 51/061* (2013.01); *F02M 47/027* (2013.01); *F02M 61/04* (2013.01);
(Continued)

(58) Field of Classification Search
CPC ................ F02M 51/061; F02M 61/04; F02M 2200/44–46
See application file for complete search history.

(56) References Cited

U.S. PATENT DOCUMENTS 4,687,136 A * 8/1987 Ozu ................. F02M 47/046
239/533.8
6,073,862 A    6/2000 Touchette
(Continued)

FOREIGN PATENT DOCUMENTS

| DE | 102015114716 A1 | 3/2017 |
| JP | 2007239735 A | 9/2007 |
| JP | 2008280985 A | 11/2008 |

OTHER PUBLICATIONS

Examination Report for Int'l. Patent Appln. No. 2018-236202, dated Jan. 10, 2023 (3 pgs).

*Primary Examiner* — Joseph A Greenlund
(74) *Attorney, Agent, or Firm* — Brannon Sowers & Cracraft PC (57) ABSTRACT

A fuel injector is disclosed. The fuel injector may have an injector body having a fuel inlet and at least one orifice. The fuel injector may also have a first check valve member. The first check valve member may be selectively movable to fluidly block a first flow of fuel from the fuel inlet to the at least one orifice. The fuel injector may have a second check valve member. The second check valve member may be selectively movable to fluidly block a second flow of fuel from the fuel inlet to the at least one orifice. The fuel injector may also have a control valve assembly. The control valve assembly may be configured to selectively operate either the first check valve or both the first check valve and the second check valve to fluidly connect the fuel inlet and the at least one orifice.

14 Claims, 7 Drawing Sheets

(51) Int. Cl.
*F16K 31/124* (2006.01)
*F02M 63/00* (2006.01)
*F02M 47/02* (2006.01)
*F02M 59/00* (2006.01)
*F16K 31/06* (2006.01)
*F02M 55/02* (2006.01)

(52) U.S. Cl.
CPC ..... *F02M 63/0064* (2013.01); *F16K 31/1245* (2013.01); *F02M 55/025* (2013.01); *F02M 59/00* (2013.01); *F02M 2200/44* (2013.01); *F02M 2200/46* (2013.01); *F16K 31/0675* (2013.01)

(56) References Cited

U.S. PATENT DOCUMENTS

| | | | |
|---|---|---|---|
| 6,336,798 B1 | 1/2002 | Ohtake | |
| 6,422,199 B1 | 7/2002 | Buckley | |
| 6,439,193 B2 | 8/2002 | Lehtonen | |
| 7,040,293 B2 | 5/2006 | Furukubo | |
| 8,448,878 B2 | 5/2013 | Ibrahim | |
| 8,459,576 B2* | 6/2013 | Kim | F02D 19/105 123/304 |
| 8,596,561 B2* | 12/2013 | Kim | F02D 19/0694 239/584 |
| 8,683,979 B2* | 4/2014 | Kim | F02M 43/00 123/456 |
| 8,839,763 B2* | 9/2014 | Mittal | F02M 43/04 123/304 |
| 8,844,842 B2* | 9/2014 | Kim | F02M 61/042 123/27 GE |
| 9,157,384 B2 | 10/2015 | Coldren | |
| 9,175,651 B2 | 11/2015 | Kim | |
| 9,206,778 B2 | 12/2015 | Kim | |
| 9,228,505 B2 | 1/2016 | Mittal | |
| 9,376,992 B2* | 6/2016 | Brown | F02M 21/0263 |
| 9,453,483 B2 | 9/2016 | Kim | |
| 9,518,518 B2* | 12/2016 | Coldren | F02D 41/0025 |
| 9,869,255 B2* | 1/2018 | Singh | F02D 37/02 |
| 11,035,332 B2* | 6/2021 | Mahmood | F02M 51/061 |
| 11,359,590 B1* | 6/2022 | John | F02M 57/06 |
| 2001/0003976 A1* | 6/2001 | Lehtonen | F02M 63/004 123/299 |
| 2002/0070295 A1* | 6/2002 | Baker | F02M 21/0254 239/533.3 |
| 2007/0246561 A1* | 10/2007 | Gibson | F02M 47/027 239/443 |
| 2010/0200679 A1* | 8/2010 | Haba | F02D 41/38 239/584 |
| 2010/0269783 A1 | 10/2010 | Hergart | |
| 2011/0108631 A1* | 5/2011 | Mumford | F02D 19/0689 239/429 |
| 2011/0162623 A1* | 7/2011 | Hayashi | F02M 63/0017 123/472 |
| 2012/0187218 A1 | 7/2012 | Kim | |
| 2012/0285417 A1* | 11/2012 | Kim | F02D 19/10 123/304 |
| 2013/0118448 A1* | 5/2013 | Kim | F02M 63/029 123/299 |
| 2013/0139790 A1* | 6/2013 | Park | F02D 19/081 123/445 |
| 2013/0247875 A1* | 9/2013 | Jay | F02D 19/0694 123/447 |
| 2014/0041637 A1* | 2/2014 | Troberg | F02D 41/3017 123/478 |
| 2014/0123936 A1* | 5/2014 | Kim | F02M 63/0035 123/456 |
| 2014/0182551 A1* | 7/2014 | Steffen | F02M 63/0225 123/446 |
| 2014/0311455 A1* | 10/2014 | Kim | F02D 19/10 239/408 |
| 2014/0316677 A1 | 10/2014 | Stockner | |
| 2014/0331962 A1* | 11/2014 | Stockner | F02D 41/22 123/304 |
| 2014/0331963 A1* | 11/2014 | Grant | F02D 19/0605 123/304 |
| 2015/0211464 A1* | 7/2015 | Ishida | F02D 19/024 239/408 |
| 2015/0247468 A1 | 9/2015 | Chittenden | |
| 2016/0305382 A1 | 10/2016 | Kim | |
| 2018/0003131 A1 | 1/2018 | Berger | |
| 2018/0313316 A1* | 11/2018 | Thibault | F02M 61/10 |
| 2018/0347500 A1* | 12/2018 | Nooijen | F02D 19/0694 |
| 2019/0063338 A1* | 2/2019 | Matsumoto | F02D 41/401 |
| 2019/0186448 A1* | 6/2019 | Mahmood | F16K 31/1245 |
| 2020/0217265 A1* | 7/2020 | Aotsuka | F02M 47/027 |

* cited by examiner

FUEL INJECTOR HAVING DUAL SOLENOID CONTROL VALVES

TECHNICAL FIELD

The present disclosure relates generally to a fuel injector and more particularly, to a fuel injector having dual solenoid control valves.

BACKGROUND

Internal combustion engines generate exhaust as a by-product of fuel combustion within the engines. Engine exhaust contains, among other things, unburnt fuel, particulate matter such as soot, and gases such as carbon monoxide and oxides of nitrogen (NOR). To comply with regulatory emissions control requirements, it is desirable to reduce the amounts of unburnt fuel, soot, NOR, and other gases in the engine exhaust. These amounts depend at least partially on the temperature of the exhaust gases in the combustion chamber.

The exhaust gas temperature in the combustion chamber may be controlled by adjusting the timing, rate, and duration of fuel supply during each combustion cycle. Many engines include fuel injectors that supply the fuel to the combustion chamber. A conventional fuel injector includes one or more orifices through which fuel is injected into the combustion chamber during each combustion cycle. A check valve is used to permit or block the flow of fuel through the orifices. Thus, the timing, rate, and duration of fuel injection may be controlled by controlling an operation of the check valve of the fuel injector.

U.S. Pat. No. 6,439,193 B2 of Lehtonen issued on Aug. 27, 2007 ("the '193 patent") and discloses an injection valve arrangement applicable to a common rail fuel injection system. The '193 patent purports to provide an improved method of controlling the injection procedure, in particular by preventing excessive injection of fuel into the combustion chamber. The fuel injector of the '193 patent includes two needle valves operationally connected in series. A first needle valve is connected to the feed pressure of the common rail and is arranged to always open before a second needle valve that controls the injection of fuel into a cylinder of the engine. The '193 patent discloses that the possibility of leakage of fuel from the injector, or of both valves sticking at the open position simultaneously is substantially reduced because of the presence of the two valves, which operate in series.

Although the '193 patent discloses a fuel injector that purports to provide greater control on the fuel injection process, the fuel injector of the '193 patent may still not adequately control the production of NO or unburnt fuel during combustion. In particular, although the fuel injector of the '193 patent may help reduce leakage of fuel, it still relies on only one of the two needle valves to control the timing, rate, or duration of fuel injection. This may be insufficient to control the rate at which temperature increases in the combustion chamber, which in turn may make the fuel injector of the '193 patent incapable of adequately controlling the amount of soot, NOR, or unburnt fuel in the exhaust gases generated in the combustion chamber.

The fuel injector of the present disclosure solves one or more of the problems set forth above and/or other problems of the prior art.

SUMMARY

In one aspect, the present disclosure is directed to a fuel injector. The fuel injector may include an injector body. The injector body may include a fuel inlet and at least one orifice. The fuel injector may also include a first check valve member. The first check valve member may be selectively movable to fluidly block a first flow of fuel from the fuel inlet to the at least one orifice. Further, the fuel injector may include a second check valve member. The second check valve member may be selectively movable to fluidly block a second flow of fuel from the fuel inlet to the at least one orifice. The fuel injector may also include a control valve assembly. The control valve assembly may be configured to selectively move the first check valve member or both the first check valve member and the second check valve member to fluidly connect the fuel inlet and the at least one orifice.

In another aspect, the present disclosure is directed to a method of operating a fuel injector, including an injector body, a fuel inlet, and at least one orifice. The method may include pressurizing fuel. The method may also include supplying the pressurized fuel to a fuel inlet of the fuel injector. Further, the method may include operating a first check valve member to fluidly connect the fuel inlet to the at least one orifice via a first passageway in the injector body. The method may include injecting a first amount of the fuel from the at least one orifice. The method may further include operating a second check valve member to selectively fluidly connect the fuel inlet to the at least one orifice via a second passageway in the injector body. The method may also include selectively injecting a second amount of the fuel from the at least one orifice.

In yet another aspect, the present disclosure is directed to a fuel system. The fuel system may include a common rail and a source of fuel. The fuel system may also include a fuel pump configured to supply fuel to the common rail from the source. The fuel system may include a fuel injector fluidly connected to the common rail. The fuel injector may be configured to receive fuel from the common rail. The fuel injector may include an injector body including a fuel inlet and a drain outlet. The fuel injector may also include a nozzle chamber disposed within the injector body. The nozzle chamber may include at least one orifice. The fuel injector may further include a first check valve member selectively movable to fluidly block a first flow of fuel from the fuel inlet to the at least one orifice. The fuel injector may also include a second check valve member selectively movable to fluidly block a second flow of fuel from the fuel inlet to the at least one orifice. Further, the fuel injector may include a first control chamber disposed at a base end of the first check valve member. The first control chamber may be connectable with the drain outlet. The fuel injector may also include a second control chamber disposed at a base end of the second check valve member. The second control chamber may be connectable with the drain outlet. The fuel injector may include a first control valve configured to selectively fluidly connect the first control chamber and the drain outlet. The fuel injector may also include a second control valve configured to selectively fluidly connect the second control chamber and the drain outlet. In addition, the fuel system may include a controller in communication with the first control valve and the second control valve. The controller may be configured to selectively operate the first check valve member or both the first check valve member and the second check valve member to fluidly connect the fuel inlet with the at least one orifice.

DETAILED DESCRIPTION

Figure 1:
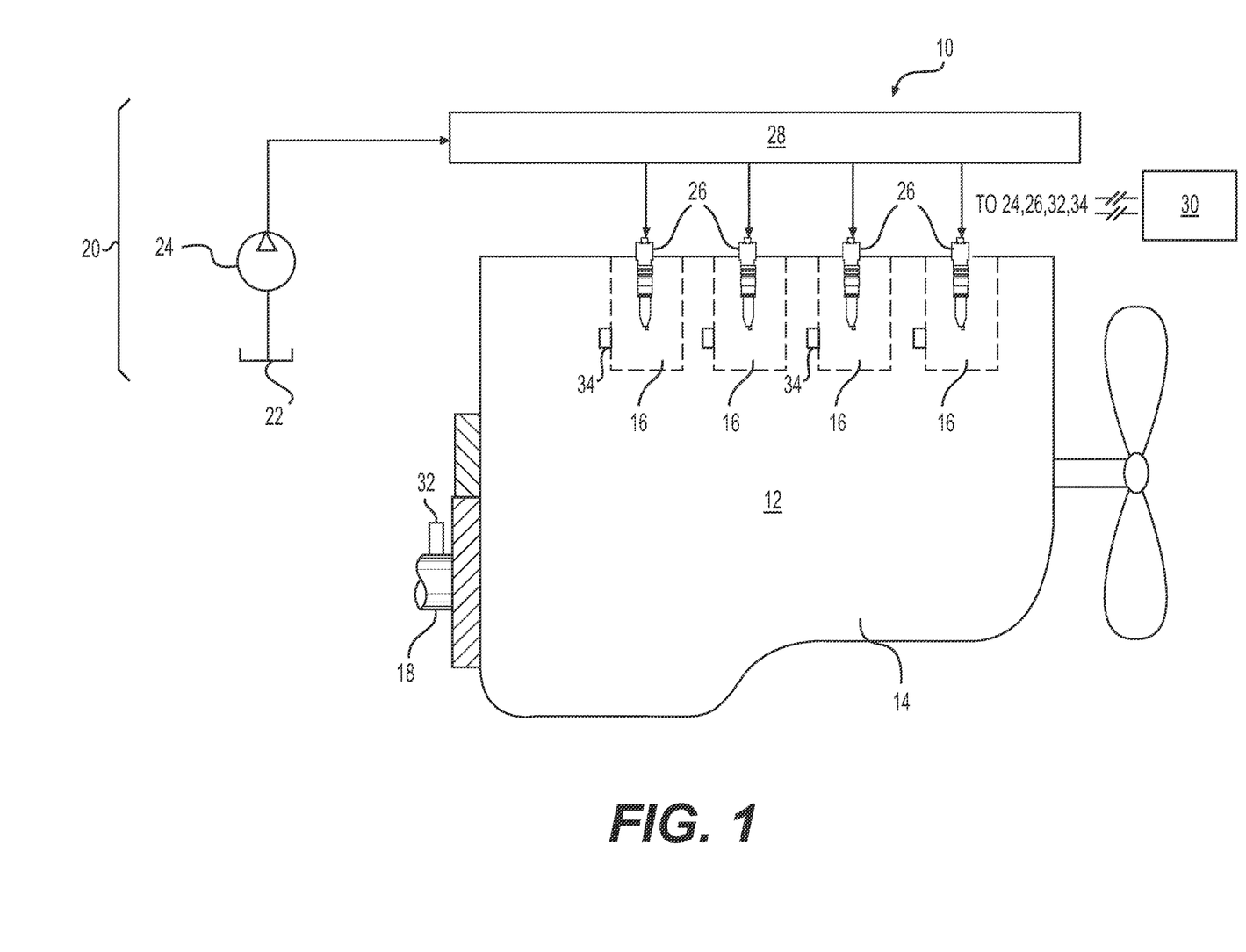
FIG. 1 is a pictorial illustration of an exemplary disclosed power system.

FIG. 1 illustrates an exemplary embodiment of power system 10 configured to combust a mixture of fuel and air to generate mechanical power. Power system 10 may include engine 12. Engine 12 may be a four-stroke diesel engine. It is contemplated, however, that engine 12 may be any other type of internal combustion engine such as, for example, a two-stroke diesel engine, a gaseous-fuel powered two-stroke engine, a gaseous-fuel powered four-stroke engine, a dual-fuel powered two-stroke or four-stroke engine, or a two-stroke or four-stroke gasoline engine. It is also contemplated that engine 12 may be a spark-ignition engine.

Engine 12 may include an engine block 14 that at least partially defines a plurality of cylinders 16. As illustrated in FIG. 1, exemplary engine 12 may include four cylinders 16. It is contemplated, however, that engine 12 may include any number of cylinders 16. Moreover, cylinders 16 in engine 12 may be disposed in an "in-line" configuration, a "V" configuration, an opposing-piston configuration, or in any other suitable configuration. Engine 12 may include crankshaft 18 rotatably disposed within engine block 14. Connecting rods (not shown) may connect a plurality of pistons (not shown) to crankshaft 18, so that combustion within the one or more cylinders 16 results in a sliding motion of each piston within a respective cylinder 16, which, in turn, results in rotation of crankshaft 18, as is conventional in a reciprocating-piston engine.

Power system 10 may include a fuel system 20 configured to deliver pressurized fuel into corresponding combustion chambers of each cylinder 16 according to a timing scheme, resulting in coordinated combustion within cylinders 16 to produce mechanical power. For example, fuel system 20 may be a high-pressure common rail system and may include source 22 configured to hold a supply of fuel, and fuel pump 24 configured pressurize the fuel from source 22 and direct the fuel to a plurality of fuel injectors 26 associated with cylinders 16 via common rail 28. While fuel system 20 is described as a common rail system, it is contemplated that other fuel system configurations may be possible. For example, fuel system 20 may include dedicated fuel lines that supply fuel directly from source 22 to fuel injectors 26.

Fuel system 20 may also include controller 30, crank angle sensor 32, and one or more temperature sensors 34. Controller 30 may be configured to control an operation of fuel system 20 based at least partially on inputs received from crank angle sensor 32 and/or temperature sensors 34. Controller 30 may embody a single or multiple microprocessors, digital signal processors (DSPs), etc. Numerous commercially available microprocessors can be configured to perform the functions of controller 30. Various other known circuits may be associated with controller 30 including power supply circuitry, signal-conditioning circuitry, and communication circuitry. Controller 30 may also be associated with one or more non-transitory storage devices, for example, memory devices, Random Access Memory (RAM) devices, NOR or NAND flash memory devices, and Read Only Memory (ROM) devices, CD-ROMs, hard disks, floppy drives, optical media, solid state storage media, etc.

Crank angle sensor 32 may be located on crankshaft 18 or on engine block 14. Crank angle sensor 32 may be a Hall Effect sensor, an optical sensor, a magnetic sensor, or any other type of crank angle sensor known in the art. Crank angle sensor 32 may be configured to send signals indicative of crank angle $\theta$, which may be an angle of rotation of crankshaft 18 relative to a top dead center (TDC) position of a piston in cylinder 16. One of ordinary skill in the art would recognize that as is conventionally known, prior to reaching the TDC position, the piston moves from adjacent crankshaft 18 towards a head end of cylinder 16, whereas after reaching the TDC position, the piston in a conventional engine moves away from the head end of cylinder 16 towards crankshaft 18. In one exemplary embodiment, crank angle sensor 32 may also be configured to send signals indicative of a rotational speed of crankshaft 18.

Temperature sensor 34 may be disposed on cylinder 16 and may be configured to determine a temperature within cylinder 16. Temperature sensor 34 may include diode thermometers, thermistors, thermocouples, infrared sensors, or any other types of temperature sensors known in the art. Controller 30 may be in communication with fuel injectors 26, crank angle sensor 32, and temperature sensors 34, and may control operations of fuel system 20 based on the signals from one or more of fuel injectors 26, crank angle sensor 32, and temperature sensors 34. It is contemplated that fuel system 20 may include other types of sensors, for example, NOx sensors, air and fuel flow rate sensors, pressure sensors, speed sensors, torque sensors, acceleration sensors, etc. It is also contemplated that fuel system 20 may include other conventional components such as filters, check valves, relief valves, etc.

Figure 2:
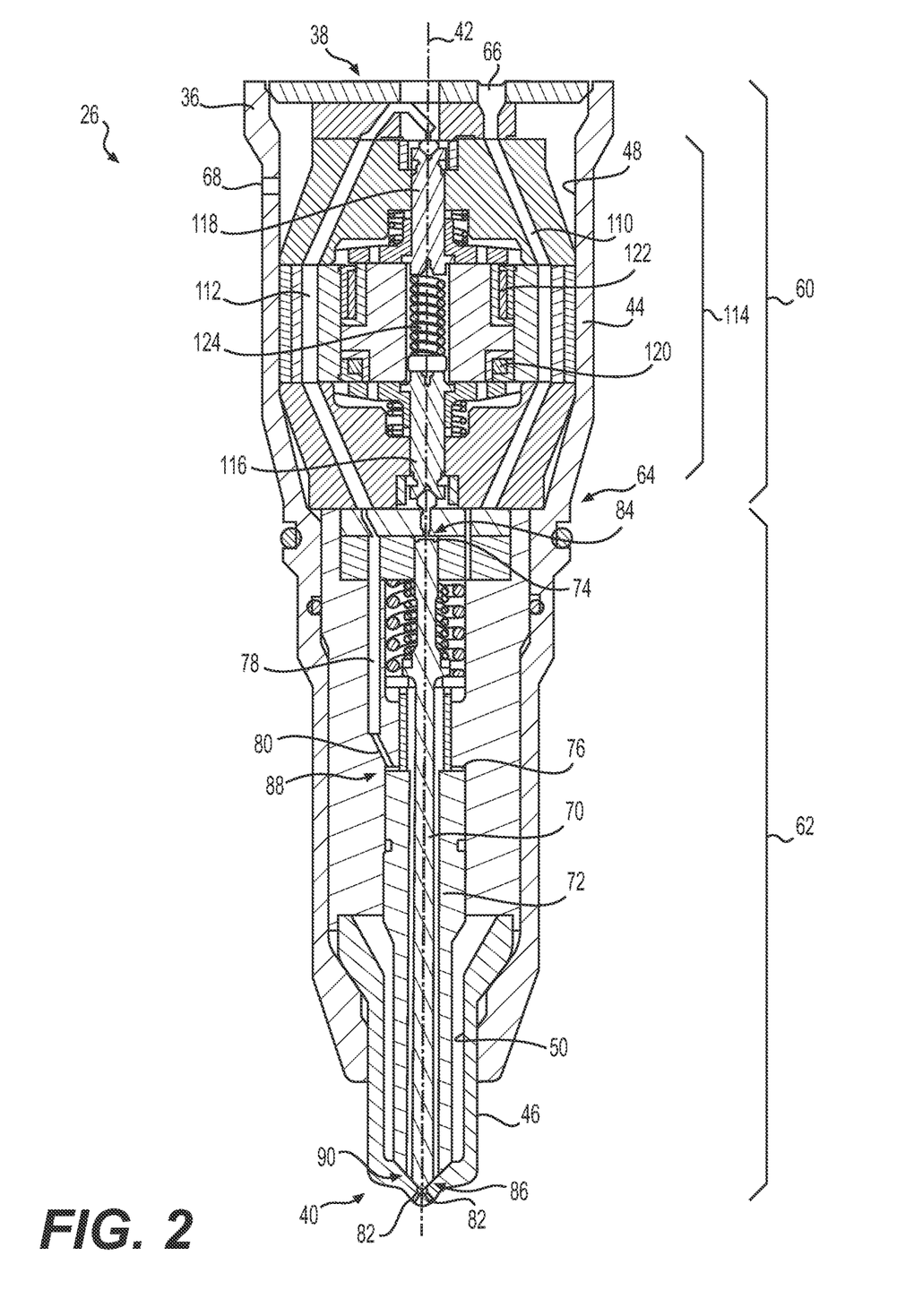
FIG. 2 is a cross-sectional illustration of an exemplary disclosed fuel injector that may be used in conjunction with the power system of FIG. 1.

FIG. 2 illustrates a cross-sectional view of an exemplary fuel injector 26. Fuel injector 26 may include fuel injector body 36, which may extend from adjacent fuel inlet end 38 to adjacent fuel discharge end 40. Fuel injector body 36 may be disposed about longitudinal axis 42 of fuel injector 26. Fuel inlet end 38 may be disposed outside cylinder 16, whereas fuel discharge end 40 may be disposed within cylinder 16. Fuel injector body 36 may include upper body 44 and lower body 46. Upper body 44 may include injector bore 48, which may extend from adjacent fuel inlet end 38 to adjacent fuel discharge end 40. In one exemplary embodiment as illustrated in FIG. 2, lower body 46 may be disposed adjacent fuel discharge end 40 and may project outward from upper body 44 through injector bore 48. Lower body 46 may include lower body bore 50, which may extend across a length of lower body 46. It is contemplated, however, that in some exemplary embodiments, upper body 44 and lower body 46 may form an integral unitary injector body 32.

Fuel injector 26 may include control portion 60 and delivery portion 62. Control portion 60 may be disposed within injector bore 48. Delivery portion 62 may be disposed partially within injector bore 48 and partially within lower body bore 50. Control portion 60 may extend from fuel inlet end 38 to control portion end 64 disposed between fuel inlet end 38 and fuel discharge end 40. Delivery portion 62 of fuel injector 26 may extend from control portion end 64 to adjacent fuel discharge end 40.

Fuel injector 26 may include fuel inlet 66 and drain outlet 68. Fuel inlet 66 may be connected to common rail 28 and may be configured to receive pressurized fuel from common rail 28. Drain outlet 68 may be connected to source 22 via a passageway (not shown). Drain outlet 68 may be configured to allow excess fuel to be returned to source 22. One of ordinary skill in the art would recognize that a pressure in common rail 28 and at fuel inlet 68 may be higher than a pressure at drain outlet 68 and in source 22.

Delivery portion 62 may include check valve member 70, check valve member 72, control chamber 74, control chamber 76, passageways 78 and 80, and one or more orifices 82. Check valve member 70 may extend from adjacent base end 84 to injection end 86. Base end 84 may be disposed adjacent control portion end 64, and injection end 86 may be disposed adjacent fuel discharge end 40. Check valve member 70 may be concentrically disposed about longitudinal axis 42. Check valve member 70 may be configured to move along its lengthwise direction along longitudinal axis 42. In one exemplary embodiment as illustrated in FIG. 2, check valve member 70 may be in the form of an elongated needle. Control chamber 74 may be disposed adjacent base end 84 of check valve member 70. Control chamber 74 may be connectable with drain outlet 68 via a passageway (not shown).

Check valve member 72 may extend from base end 88 to injection end 90. Base end 88 may be disposed between base end 84 and fuel discharge end 40, and injection end 90 may be disposed adjacent fuel discharge end 40. In one exemplary embodiment as illustrated in FIG. 2, check valve member 72 may be in the form of an elongated needle. Control chamber 76 may be disposed adjacent base end 88 of check valve member 72. Control chamber 76 may be connectable with drain outlet 68 via passageways 78 and 80. The dimensions of passageways 78 and 80 may be selected to control a rate at which fuel may be allowed to drain from control chamber 76 to drain outlet 68.

Figure 3:
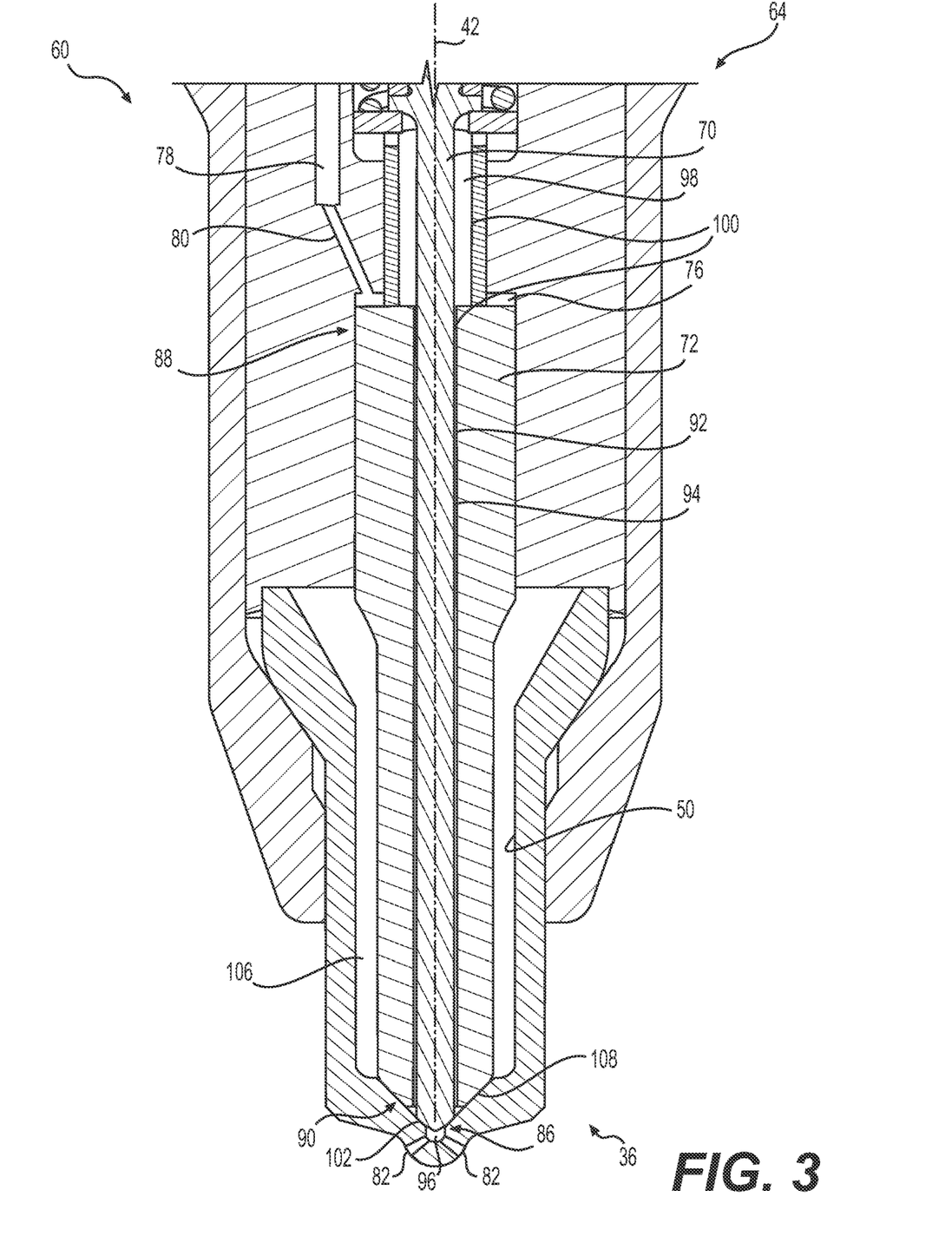
FIG. 3 is a magnified illustration of a portion of the fuel injector of FIG. 2.

FIG. 3 illustrates a magnified view of delivery portion 62 of fuel injector 26. As illustrated in FIG. 3, check valve member 72 may include bore 92 extending from base end 88 to adjacent injection end 90. Check valve member 70 may be disposed within bore 92 of check valve member 72. In one exemplary embodiment as illustrated in FIG. 3, check valve member 70 may be disposed concentrically with bore 92. Check valve member 70 may be separated from bore 92 of check valve member 72 by clearance 94. In some exemplary embodiments, clearance 94 may be termed "M orifice."

As also illustrated in FIG. 3, delivery portion 62 may include sac 96 and upper nozzle space 98. Sac 96 may be disposed between injection end 86 of check valve member 70 and injector body 32 and may be configured to hold pressurized fuel received from fuel inlet 66. Orifice 82 may be configured to fluidly connect sac 96 with cylinder 16. Upper nozzle space 98 and clearance 94 may define nozzle chamber 100. As illustrated in FIG. 3, check valve member 70 may be disposed within nozzle chamber 100. Nozzle chamber 100 may be connected with fuel inlet 66 via one or more passageways (not shown) in injector body 32. Nozzle chamber 100 may deliver fuel from fuel inlet 66 to sac 96.

Check valve member 70 may be configured to move from a closed position to an open position. In its closed position, check valve member 70 may sealingly be in contact with nozzle seat 102 in injector body 32 so as to block a flow of fuel from fuel inlet 66 to sac 96 to the one or more orifices 82. In its open position, check valve member 70 may be out of contact with nozzle seat 102 allowing the flow of fuel to sac 96 and the one or more orifices 82.

Connecting nozzle chamber 100 to fuel inlet 66 may expose injection end 86 of check valve member 70 to high pressure from common rail 28. As discussed above, control chamber 74 (see FIG. 2) may be connectable to drain outlet 68, which may have a relatively low pressure compared to the pressure in common rail 28. Thus, when control chamber 74 is connected to drain outlet 68, check valve member 70 may be subjected to a pressure difference, with a high pressure corresponding to the pressure in common rail 28 acting on injection end 86, and a low pressure of source 22 acting on base end 84 through control chamber 74. As a result of this pressure difference, check valve member 70 may move from its closed position to its open position along longitudinal axis 42 in a direction from injection end 86 towards base end 84. In is open position, when check valve member 70 is out of contact with nozzle seat 102, check valve member 70 may permit a flow of fuel to sac 96 and the one or more orifices 82 into cylinder 16. Thus, moving check valve member 70 from its closed position to its open position may allow a first flow of fuel from fuel inlet 66 through nozzle chamber 100 to the one or more orifices 82 and to cylinder 16.

A fuel flow rate or an amount of fuel flow through the one or more orifices 82, caused by operation of check valve member 70, may be determined at least in part based on the geometrical dimensions of clearance 94 between check valve member 70 and bore 92. In one exemplary embodiment, clearance 94 may be generally uniform along a length of check valve member 70 and bore 92 from adjacent base end 88 to adjacent injection end 90. In another exemplary embodiment, clearance 94 may vary along the length of check valve member 70 and bore 92. In yet another exemplary embodiment, a dimension of clearance 94 adjacent base end 88 may be larger relative to a dimension of clearance 94 adjacent injection end 90. In other exemplary embodiments, the dimension of clearance 94 adjacent injection end 90 may be larger than the dimension of clearance 94 adjacent base end 88. It is also contemplated that in some exemplary embodiments, a dimension of clearance 94 may be larger at a location between base end 88 and injection end 90.

Check valve member 72 may be disposed within lower body bore 50 of lower body 46. Check valve member 72 may be radially spaced apart from lower body bore 50. A space between check valve member 72 and lower body bore 50 may define nozzle chamber 106. Nozzle chamber 106 may be connected to fuel inlet 66 via one or more passageways (not shown) within injector body 32. Check valve member 72 may be configured to move from a closed position to an open position. In its closed position, check valve member 72 may sealingly be in contact with nozzle seat 108 in injector body 32 so as to block flow of fluid from fuel inlet 66 and nozzle chamber 106 to sac 96. In its open position, check valve member 72 may be out of contact with nozzle seat 108, allowing fuel to flow from nozzle chamber 106 to sac 96.

As discussed above, nozzle chamber 106 may be connected to fuel inlet 66, which may expose injection end 90 of check valve member 72 to high pressure from common rail 28. As also discussed above, control chamber 76 may be connectable to drain outlet 68, which may have a relatively low pressure compared to the pressure in common rail 28. Thus, when control chamber 76 is connected to drain outlet 68, check valve member 72 may be subjected to a pressure difference, with a high pressure corresponding to the pressure in common rail 28 acting on injection end 90, and a low pressure of source 22 acting on base end 88 through control chamber 76. As a result of this pressure difference, check valve member 72 may move from its closed position to its open position along longitudinal axis 42 in a direction from injection end 90 towards base end 88. In its open position, when check valve member 72 is out of contact with nozzle seat 108, check valve member 72 may permit a flow of fuel from nozzle chamber 106 to sac 96, which flow of fuel may be injected into cylinder 16 through the one or more orifices 82. Thus, moving check valve member 72 from its closed position to its open position may allow a second flow of fuel from fuel inlet 66 through nozzle chamber 106 to the one or more orifices 82 and to cylinder 16. Further, moving check valve member 72 from its closed position to its open position may also allow high pressure from common rail 28 to be applied to check valve member 70 adjacent nozzle seat 102 by allowing fuel to flow from fuel inlet 66 to flow through nozzle chamber 106 to nozzle chamber 110. Thus, the pressure applied to check valve member 70 may be altered by operation of check valve member 72.

A fuel flow rate or an amount of fuel flow through the one or more orifices 82, caused by operation of check valve member 72 may be determined at least in part based on a gap (not shown) between check valve member 72 and nozzle seat 108. One of ordinary skill in the art would recognize that when both check valve member 70 and check valve member 72 are in their respective open positions, fuel may flow into sac 96 from both nozzle chamber 100 and nozzle chamber 106. Thus, opening both check valve member 70 and check valve member 72 may allow a second amount of fuel to flow out of orifices 82 into cylinder 16 as compared to a first amount of fuel that may flow through orifices 82 into cylinder 16 when only check valve member 70 may be in an open position with check valve member 72 remaining in its closed position.

Returning to FIG. 2, control portion 60 may include passageway 110, passageway 112, and control valve assembly 114. Passageway 110 may be disposed within fuel injector body 36 and may be configured to deliver pressurized fuel from fuel inlet 66 to nozzle chamber 100 and nozzle chamber 106 in delivery portion 62 of fuel injector 26. It is contemplated that control portion 60 and/or delivery portion 62 may include additional passageways (not shown) that may connect passageway 110 with nozzle chamber 100 and nozzle chamber 106. In some exemplary embodiments, additional passageways (not shown) in control portion 60 and/or delivery portion 62 may connect passageway 110 and fuel inlet 66 to one or both of control chambers 74 and 76.

Passageway 112 may be disposed within fuel injector body 36 and may be configured to connect control chambers 74 and 76 in delivery portion 62 of fuel injector 26 with source 22 via drain outlet 68. For example, as illustrated in FIG. 2, passageway 112 may connect passageways 78 and 80 to drain outlet 68. Although only two passageways 110 and 112 are illustrated in fuel injector body 36, it is contemplated that fuel injector may include more than one passageway 110 connecting the fuel inlet with nozzle chambers 100 and 106 and more than one passageway 112 connecting control chambers 74 and/or 76 with drain outlet 68.

Control valve assembly 114 may include control valve 116, control valve 118, solenoid 120, and solenoid 122. In one exemplary embodiment, control valves 116 and 118 may be two-way or three-way solenoid control valves. It is also contemplated, however, that control valves 116 and 118 may be controlled via arrangements other than a solenoid. For example, in some exemplary embodiments, control valves 116 and 118 may be controlled via camming arrangements or through the use of biasing members such as springs.

In one exemplary embodiment as illustrated in FIG. 2, control valve 116 may be positioned in injector body 32 adjacent control portion end 64, and between fuel inlet end 38 and control portion end 64. Control valve 116 may be movable along longitudinal axis 42 between a first position in which control chamber 74 is fluidly blocked from drain outlet 68, and a second position in which control chamber 74 is fluidly connected to drain outlet 68. As illustrated in FIG. 2, control valve 116 may be biased by biasing member 124 towards its first position. In one exemplary embodiment as illustrated in FIG. 2, biasing member 124 may be in the form of a spiral spring, although other shapes are also contemplated.

Solenoid 120 may be disposed adjacent control portion end 64. Solenoid 120 may be operable to move control valve 116 against a biasing force of biasing member 124 such that control chamber 74 may be connected to drain outlet 68 via one or more passageways (not shown) in injector body 32. Thus, by operation of solenoid 120, control chamber 74 associated with check valve member 70 may be connected to or blocked from drain outlet 68.

Control valve 118 may be positioned in injector body 32 adjacent fuel inlet end 38, and between fuel inlet end 38 and control valve 116. Control valve 118 may be movable along longitudinal axis 42 between a first position in which passageway 112 associated with check valve member 72 is fluidly blocked from drain outlet 68, and a second position in which passageway 112 is fluidly connected to drain outlet 68. Control valve 118 may be biased by biasing member 124 towards its first position. In one exemplary embodiment as illustrated in FIG. 2, biasing member 124 may be disposed between control valve 116 and control valve 118. It is contemplated, however, that control valves 116 and 118 may each have its own separate biasing member 124.

Solenoid 122 may be disposed adjacent control valve 118. Solenoid 122 may be operable to move control valve 118 against a biasing force of biasing member 124 such that passageway 112 may be connected to drain outlet 68. Thus, by operation of solenoid 122, control chamber 76 associated with check valve member 72 may be connected to or blocked from drain outlet 68 via passageways 78, 80, and 112. Although control valve 116 and solenoid 120 have been described above as being positioned adjacent control portion end 64, it is contemplated that control valve 116 and solenoid 120 may instead be positioned adjacent fuel inlet end 38 or elsewhere in injector body 36. Likewise, although control valve 118 and solenoid 122 have been described above as being positioned adjacent fuel inlet end 38, it is contemplated that control valve 118 and solenoid 122 may instead be positioned adjacent control portion end 64 or elsewhere in injector body 36.

As discussed above, in some exemplary embodiments, control chambers 74 and 76 may also be connected to fuel inlet 66. One of ordinary skill in the art would recognize, however, that even when control chamber 74 is connected to fuel inlet 66, when control chamber 74 is also connected to drain outlet 68, the fluid connection to drain outlet 68 may be sufficient to reduce a pressure in control chamber 74, causing check valve member 70 to move to its open position. Likewise, one of ordinary skill in the art would recognize that even when control chamber 76 is connected to fuel inlet 66, when control chamber 76 is also connected to drain outlet 68, the fluid connection to drain outlet 68 may be sufficient to reduce a pressure in control chamber 76, causing check valve member 72 to move to its open position.

Figure 4:
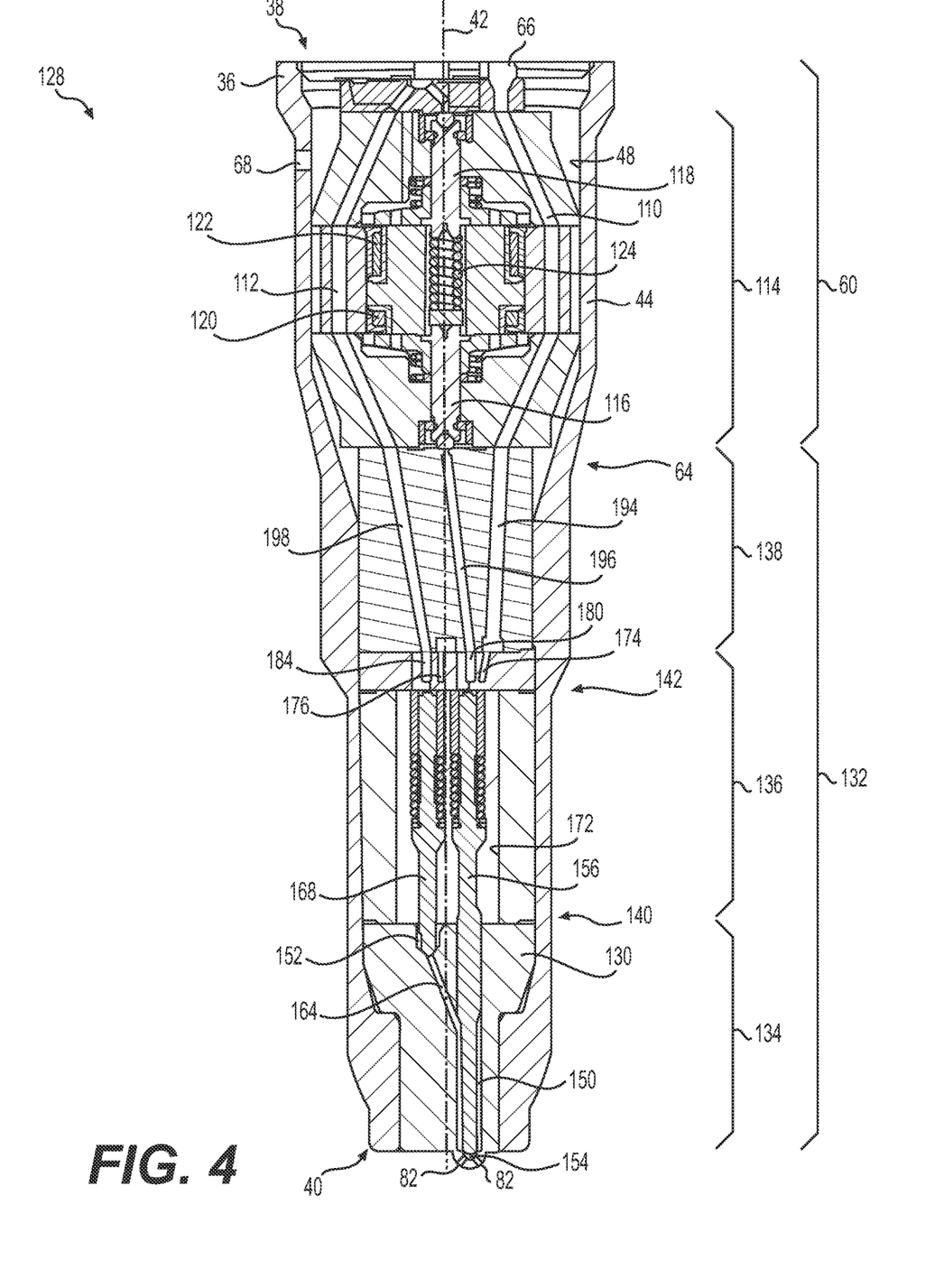
FIG. 4 is a cross-sectional illustration of another exemplary disclosed fuel injector that may be used in conjunction with the power system of FIG. 1.

FIG. 4 illustrates a cross-sectional view of an exemplary fuel injector 128. Many of the features of fuel injector 128 are similar to corresponding features of fuel injector 26. For example, like fuel injector 26, fuel injector 128 may include upper body 44 and control portion 60, including passageways 110 and 112, and control valve assembly 114. These and other common features of fuel injectors 26 and 128 are labeled in FIG. 4 using the same numerals as used in FIG. 2 corresponding to fuel injector 26. Furthermore, the above description of the common features in connection with FIG. 2 applies equally to these features of fuel injector 128. Only features of fuel injector 128 that are different from those of fuel injector 26 are discussed in detail below.

Fuel injector 128 may include delivery portion 132, which may be different from delivery portion 62 of fuel injector 26. Delivery portion 132 may include lower body 130, and may extend from control portion end 64 to fuel discharge end 40. Delivery portion 132 of fuel injector 128 may include nozzle portion 134, body portion 136, and upper portion 138. Nozzle portion 134 may extend from adjacent fuel discharge end 40 to nozzle portion end 140 disposed between control portion end 64 and fuel discharge end 40. Body portion 136 may extend from nozzle portion end 140 to body portion end 142 disposed between control portion end 64 and nozzle portion end 140. Upper portion 138 may extend from control portion end 64 to body portion end 142.

Figure 5:
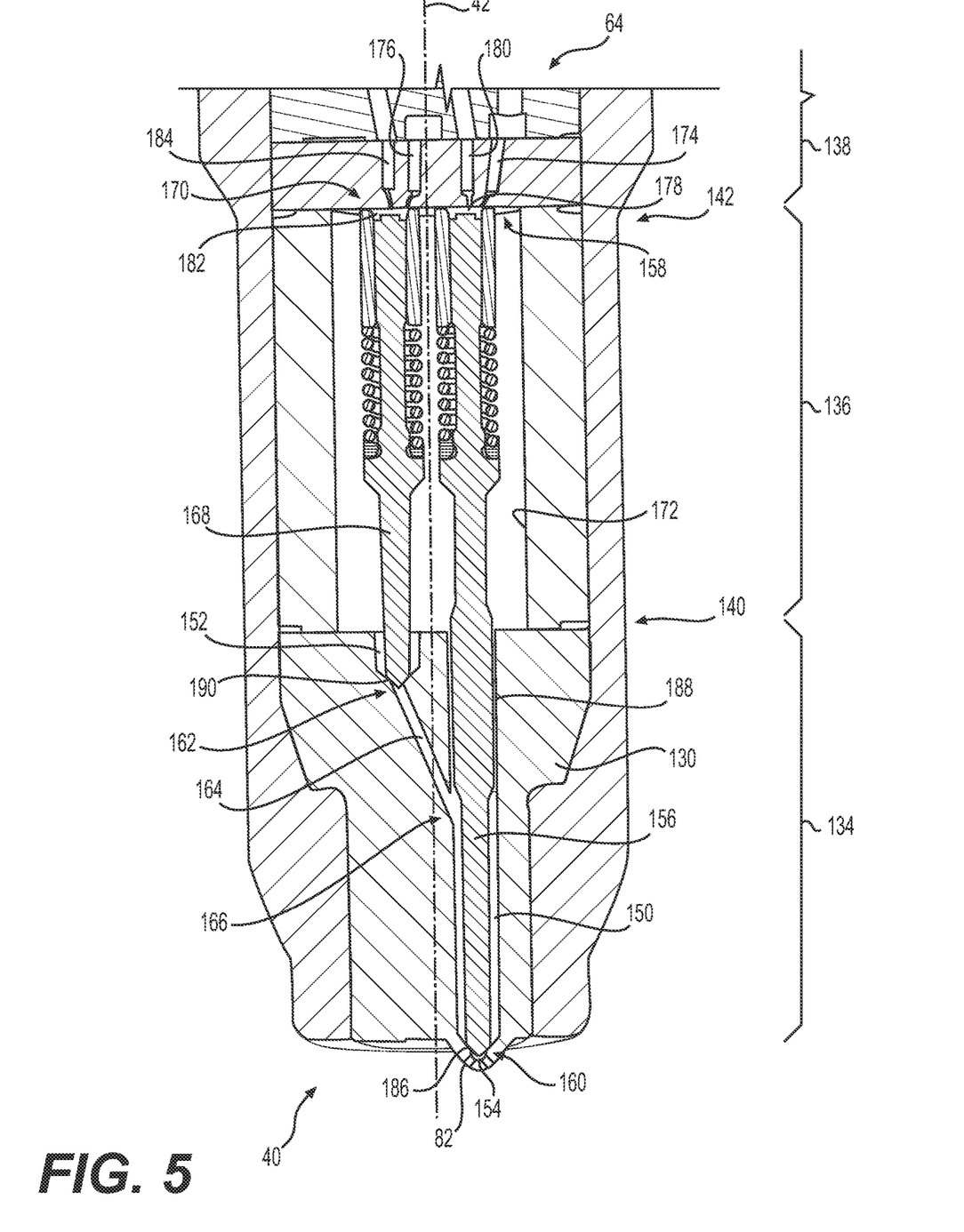
FIG. 5 is a magnified illustration of a portion of the fuel injector of FIG. 4.

Nozzle portion 134 may include lower body 130, nozzle chamber 150, nozzle chamber 152, and sac 154. Lower body 130 may be disposed within injector bore 48 and may extend from nozzle portion end 140 to adjacent fuel discharge end 40. FIG. 5 illustrates a magnified view of nozzle portion 134 and body portion 136 of fuel injector 128. Nozzle portion 134 may include nozzle chamber 150 and nozzle chamber 152 disposed in lower body 130. Nozzle chambers 150 and 152 may be disposed adjacent to and diametrically spaced apart from each other. Nozzle chamber 150 may be in the form of a bore extending from nozzle portion end 140 to adjacent fuel discharge end 40 in lower body 130. As illustrated in FIG. 5, nozzle chamber 150 may be radially offset relative to longitudinal axis 42. Nozzle chamber 150 may be connected to fuel inlet 66.

Check valve member 156 may extend from adjacent base end 158 to injection end 160. Base end 158 may be disposed adjacent body portion end 142, and injection end 160 may be disposed adjacent fuel discharge end 40. At least a portion of check valve member 156 may be disposed in nozzle chamber 150. Check valve member 156 may be configured to move along its lengthwise direction (e.g. between base end 158 and injection end 160).

Nozzle chamber 152 may be in the form of a bore extending from nozzle portion end 140 partway into lower body 130 to nozzle chamber end 162 disposed between nozzle portion end 140 and fuel discharge end 40. Nozzle chamber 152 may be connected to fuel inlet 66. Passageway 164 may be disposed within lower body 130 and may connect nozzle chamber 152 and nozzle chamber 150. In one exemplary embodiment as illustrated in FIG. 5, passageway 164 may be fluidly connected to nozzle chamber 152 adjacent nozzle chamber end 162. Passageway 164 may also be fluidly connected to nozzle chamber 150 at nozzle chamber connection 166, which may be disposed between nozzle portion end 140 and injection end 160. It is contemplated that in some exemplary embodiments, passageway 164 may be fluidly connected to nozzle chamber 150 adjacent nozzle portion end 140.

Check valve member 168 may extend from adjacent base end 170 to adjacent nozzle chamber end 162. Base end 170 may be disposed adjacent body portion end 142. A portion of check valve member 168 may be disposed in nozzle chamber 152. Check valve member 168 may be configured to move along its lengthwise direction (e.g. between base end 170 and nozzle chamber end 162, and vice-versa).

Body portion 136 may include bore 172 extending from adjacent nozzle portion end 140 to body portion end 142. Bore 172 may define a volume, which may be connected to fuel inlet 66 via one or both of passageways 174 and 176. A portion of both check valve members 156 and 168 may be disposed within bore 172. In one exemplary embodiment as illustrated in FIG. 5, check valve member 156 may be arranged adjacent to and diametrically spaced apart from check valve member 168 within bore 172. Nozzle chambers 150 and 152 may be fluidly connected to bore 172 and may receive pressurized fuel from bore 172, which in turn may receive pressurized fuel from fuel inlet 66. Although specific passageways, for example, passageways 174, 176 have been described above, it is contemplated that in some exemplary embodiments, injector body 36 may include other passageways (not shown) that may connect fuel inlet 66 with bore 172.

Control chamber 178 may be associated with check valve member 156 and may be disposed in body portion 136 adjacent base end 158 of check valve member 156. Control chamber 178 may be connectable with drain outlet 68 via passageway 180. Control chamber 182 may be associated with check valve member 168 and may be disposed adjacent base end 170 of check valve member 168. Control chamber 182 may be connectable with drain outlet 68 via passageway 184. Although specific passageways, for example, passageways 180, 184 have been described above, it is contemplated that in some exemplary embodiments, injector body 36 may include other passageways (not shown) that may connect control chambers 178 and 182 with drain outlet 68.

Check valve member 156 may be configured to move from a closed position to an open position. In its closed position, check valve member 156 may sealingly be in contact with nozzle seat 186 in nozzle chamber 150 so as to block flow of fuel from nozzle chamber 150 to sac 154 and the one or more orifices 82. In its open position, check valve member 156 may be out of contact with nozzle seat 186 so as to allow the fuel to flow from nozzle chamber 150 to sac 154 and the one or more orifices 82.

Connecting nozzle chamber 150 to fuel inlet 66 via, for example, bore 172 and passageway 174 may expose injection end 160 of check valve member 156 to high pressure from common rail 28. As discussed above, control chamber 178 may be connectable to drain outlet 68 via, for example, passageway 180. Thus, when control chamber 178 is connected to drain outlet 68, check valve member 156 may be subjected to a pressure difference, with a high pressure corresponding to the pressure in common rail 28 acting adjacent injection end 160, and a low pressure of source 22 acting on base end 158 through control chamber 178. As a result of this pressure difference, check valve member 156 may move from its closed position to its open position in a direction from injection end 160 towards base end 158. In its open position, when check valve member 156 is out of contact with nozzle seat 186, check valve member 156 may permit a flow of fuel through sac 154 and the one or more orifices 82 into cylinder 16. Thus, moving check valve member 156 from its closed position to its open position may allow a first flow of fuel from fuel inlet 66 through nozzle chamber 150 to the one or more orifices 82 and to cylinder 16.

A fuel flow rate or an amount of fuel flow through nozzle chamber 150, caused by operation of check valve member 156, may be determined at least in part based on dimensions of clearance 188 between check valve member 156 and nozzle chamber 150. In one exemplary embodiment, clearance 188 may be generally uniform along a length of check valve member 156 from adjacent nozzle portion end 140 to adjacent nozzle chamber connection 166. In another exemplary embodiment, clearance 188 may vary along the length of check valve member 156. In yet another exemplary embodiment, a dimension of clearance 188 adjacent nozzle portion end 140 may be larger relative to a dimension of clearance 188 adjacent nozzle chamber connection 166. It is also contemplated that in some exemplary embodiments, a dimension of clearance 188 may be larger between nozzle portion end 140 and nozzle chamber connection 166 as compared to dimensions of clearance 188 adjacent nozzle portion end 140 and nozzle chamber connection 166.

Check valve member 168 may be configured to move from a closed position to an open position. In its closed position, check valve member 168 may sealingly be in contact with nozzle seat 190 in nozzle chamber 152 so as to block a flow of fuel from nozzle chamber 152 to nozzle chamber 150 via passageway 164. In its open position, check valve member 168 may be out of contact with nozzle seat 190 permitting fuel to flow from nozzle chamber 152 to nozzle chamber 150 via passageway 164.

As discussed above, nozzle chamber 152 may be connected to fuel inlet 66 via, for example, passageway 176, which may expose nozzle chamber end 162 to high pressure from common rail 28. As also discussed above, control chamber 182 may be connectable to drain outlet 68 via, for example, passageway 184 which may have a relatively low pressure compared to the pressure in common rail 28. Thus, when control chamber 182 is connected to drain outlet 68, check valve member 168 may be subjected to a pressure difference, with a high pressure corresponding to the pressure in common rail 28 acting adjacent nozzle chamber end 162, and a low pressure of source 22 acting on base end 170 through control chamber 182. As a result of this pressure difference, check valve member 168 may move from its closed position to its open position in a direction from nozzle chamber end 162 towards base end 170. In its open position, when check valve member 168 is out of contact with nozzle seat 190, check valve member 168 may permit a flow of fuel from nozzle chamber 152 to nozzle chamber 150 via passageway 164. Thus, moving check valve member 168 from its closed position to its open position may allow a second flow of fuel from fuel inlet 66 through nozzle chamber 152 to nozzle chamber 150 and to the one or more orifices 82. Further, moving check valve member 168 from its closed position to its open position may also allow high pressure from common rail 28 to be applied to check valve member 156 adjacent nozzle chamber connection 166 by allowing fuel to flow from fuel inlet 66 to flow through nozzle chamber 152 to nozzle chamber 150. It is contemplated that in some exemplary embodiments, passageway 164 may be fluidly connected to control chamber 178. In these exemplary embodiments, operation of check valve member 168 may help adjust a pressure of control chamber 178 by allowing fuel to flow from fuel inlet 66 through nozzle chamber 152 to control chamber 178, which in turn may help control movement of check valve member 156 causing it to be in contact with or out of contact with nozzle seat 186. Thus, the pressure applied to check valve member 156 may be altered by operation of check valve member 168.

A rate of fuel flow from nozzle chamber 152 to nozzle chamber 150, caused by operation of check valve member 168, may be determined at least in part based on a gap (not shown) between check valve member 168 and nozzle seat 190 and by the dimensions of passageway 164. One of ordinary skill in the art would recognize that when both check valve member 156 and check valve member 168 are in their respective open positions, fuel may flow into sac 154 from both nozzle chamber 150 and nozzle chamber 152. Thus, opening both check valve member 156 and check valve member 168 may allow a second amount of fuel to flow out of orifices 82 into cylinder 16 as compared to a first amount of fuel that may flow through orifices 82 into cylinder 16 when only check valve member 156 may be in an open position with check valve member 168 remaining in its closed position.

Returning to FIG. 4, upper portion 138 may include passageways 194, 196, and 198, each of which may extend from control portion end 64 to body portion end 142. Passageway 194 may connect passageways 174 and 176 with fuel inlet 66 via passageway 110. Passageway 196 may connect passageway 180 with drain outlet 68, and passageway 198 may connect passageway 194 with drain outlet 68 via passageway 112.

Solenoid 120 may be operable to move control valve 116 against a biasing force of biasing member 124 such that passageway 180 may be connected to drain outlet 68. Thus, by operation of solenoid 120, control chamber 178 associated with check valve member 156 may be connected to drain outlet 68. Solenoid 122 may be operable to move control valve 118 against a biasing force of biasing member 124 such that control chamber 182 may be connected to drain outlet 68 via passageways 112, 184, and 198.

As discussed above, in some exemplary embodiments, control chambers 178 and 182 may also be connected to fuel inlet 66. One of ordinary skill in the art would recognize, however, that even when control chamber 178 is connected to fuel inlet 66, when control chamber 178 is also connected to drain outlet 68, the fluid connection to drain outlet 68 may be sufficient to reduce a pressure in control chamber 178, causing check valve member 156 to move to its open position. Likewise, one of ordinary skill in the art would recognize that even when control chamber 182 is connected to fuel inlet 66, when control chamber 182 is also connected to drain outlet 68, the fluid connection to drain outlet 68 may be sufficient to reduce a pressure in control chamber 182, causing check valve member 168 to move to its open position.

INDUSTRIAL APPLICABILITY

The fuel system of the present disclosure may be used to continuously adjust the timing of injection, a flow rate or amount of fuel, and a duration of injection of fuel into combustion chambers of an engine during operation of the engine. In particular, the fuel system of the present disclosure may determine a temperature in the one or more cylinders of the engine, and/or an amount of NOx in the exhaust gases produced by the combustion of fuel in the cylinders of the engine. Based on the measured temperature and/or amount of NOx, the fuel system of the present disclosure may control a timing of injection, a rate at which fuel is injected into the cylinders during a combustion cycle, and a duration of injection of fuel into the cylinders. By doing so, the fuel system of the present disclosure may help reduce a temperature in the cylinders, which in turn may help reduce an amount of soot and/or an amount of $NO_x$ produced by the combustion process. An exemplary method of operating fuel injector 26 or 128 will be described below.

Figure 6:
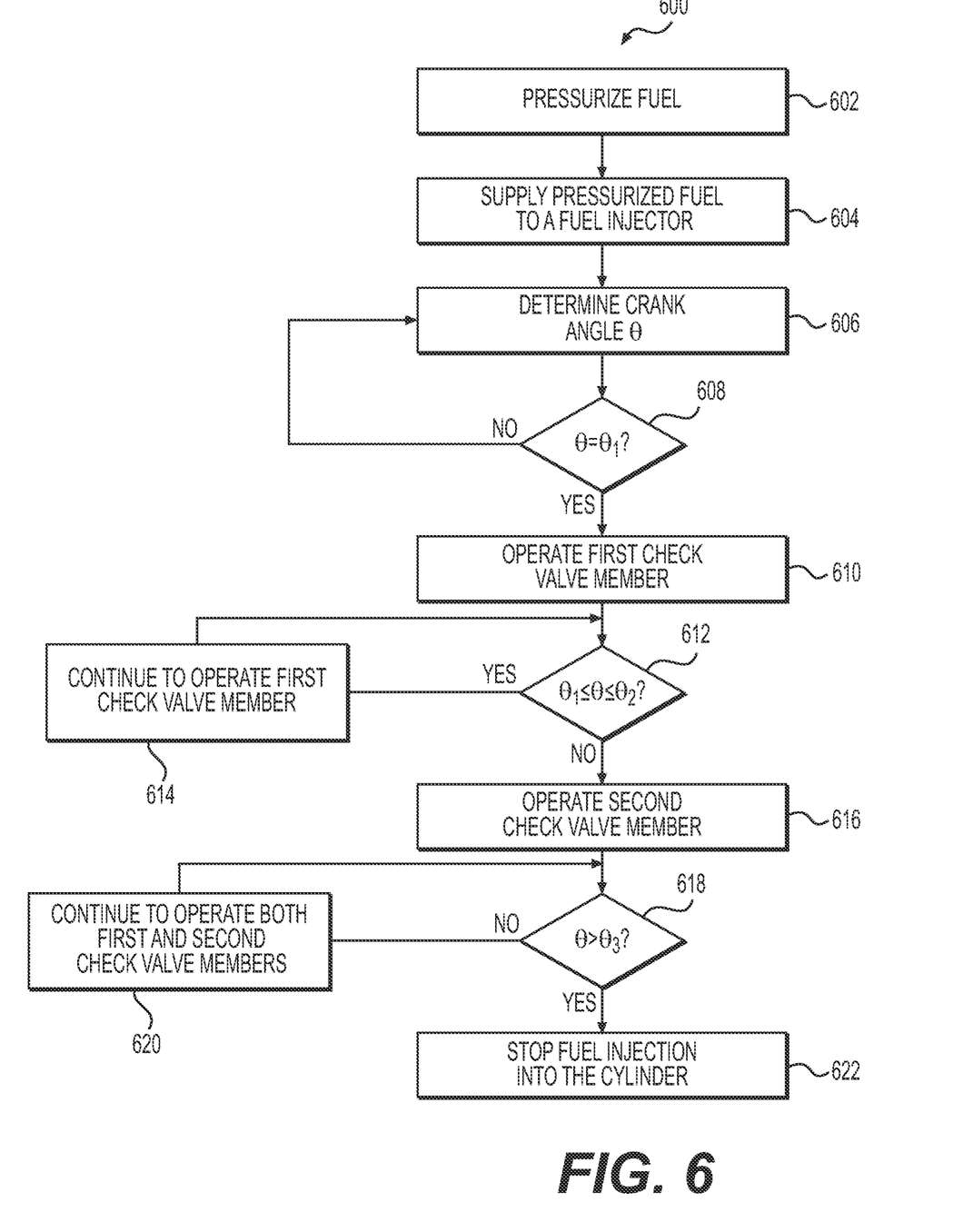
FIG. 6 is a flowchart illustrating an exemplary disclosed method of operating the fuel injectors of FIGS. 2 and 4.

FIG. 6 illustrates an exemplary method 600 of operation of fuel system 20 of engine 12. The order and arrangement of steps of method 600 is provided for purposes of illustration. As will be appreciated from this disclosure, modifications may be made to method 600 by, for example, adding, combining, removing, and/or rearranging the steps of method 600. In one exemplary embodiment, method 600 may be executed by controller 30. It is contemplated, however, that fuel injectors 26 or 128 may be controlled mechanically via, for example, camming arrangements, or using other techniques for operating control valves 116, 118, and/or one or more of check valve members 70, 72, 156, or 168. Further, method 600 may be applied to some or all cylinders 16 of engine 12.

Method 600 may include a step of pressurizing fuel (Step 602). In one exemplary embodiment, controller 30 may control fuel pump 24 to begin drawing fuel from source 22 and pressurizing the fuel for delivery to engine 12. Method 600 may include a step of supplying pressurized fuel to a fuel injector (Step 604). Controller 30 may control one or more control valves and/or check valves associated with fuel system 20 to permit a flow of pressurized fuel to flow to fuel inlet 66 of fuel injector 26 or 128.

Method 600 may include a step of determining a crank angle "θ" (Step 606). In one exemplary embodiment, controller 30 may receive signals from crank angle sensor 32. Controller 30 may rely on correlations, tables, maps, or other algorithms stored in a memory device associated with controller 30 to determine the crank angle θ relative to a TDC position of a piston in cylinder 16 associated with fuel injector 26 or 128.

Method 600 may include a step of determining whether crank angle θ is about equal to a crank angle "$\theta_1$" (Step 608). Crank angle $\theta_1$ may represent a first threshold value of crank angle θ signifying a beginning of the fuel injection process. When controller 30 determines that the crank angle θ measured by, for example, crank angle sensor 32 is less than crank angle $\theta_1$ (Step 608: NO), controller 30 may return to step 606. When controller 30 determines, however, that the crank angle θ is about equal to crank angle $\theta_1$ (Step 608: YES), controller 30 may proceed to step 610.

Method 600 may include a step of operating a first check valve member (Step 610). In step 610, controller 30 may energize solenoid 120 of fuel injector 26 or 128. Energizing solenoid 120 may cause control valve 116 to move from its first position to its second position, overcoming the biasing force exerted by biasing member 124. As discussed above, in its second position, control valve 116 may cause control chamber 74 of fuel injector 26 to be fluidly connected to drain outlet 68, which may reduce a pressure in control chamber 74 relative to a pressure of the fuel acting on check valve member 70 adjacent injection end 86. The high pressure adjacent injection end 86 may cause check valve member 70 to move along longitudinal axis 42 out of contact with nozzle seat 102, allowing a first flow of fuel to flow out of nozzle chamber 100 through sac 96 and the one or more orifices 82 into cylinder 16.

Similarly when controller 30 is configured to control fuel injector 128, when control valve 116 moves to its second position, control valve 116 may cause control chamber 178 of fuel injector 128 to be fluidly connected to drain outlet 68, which may reduce a pressure in control chamber 178 relative to a pressure of the fuel acting on check valve member 156 adjacent injection end 160. The high pressure adjacent injection end 160 may cause check valve member 156 to move out of contact with nozzle seat 186, allowing a first flow of fuel to flow out of nozzle chamber 150 through sac 154 and the one or more orifices 82 into cylinder 16.

Method 600 may include a step of determining whether crank angle θ is greater than or equal to crank angle "$\theta_1$" and less than or equal to crank angle "$\theta_2$" (Step 612). Crank angle $\theta_2$ may represent a second threshold value of crank angle θ at which an amount of fuel being injected into cylinder 16 may be changed. In step 612, controller 30 may perform functions similar to those discussed above with respect to, for example, step 606 to determine the crank angle θ. Controller may compare the determined value of crank angle θ with the threshold values $\theta_1$ and $\theta_2$. When controller 30 determines that the crank angle θ measured by, for example, crank angle sensor 32 is greater than or equal to crank angle $\theta_1$ and less than or equal to crank angle $\theta_2$ (Step 612: YES), controller 30 may proceed to step 614 of continuing to operate the first check valve member. In this step, controller 30 may continue to keep solenoid 120 energized to allow the first flow of fuel to flow out of orifices 82 of fuel injector 26 or 128. When controller 30 determines, however, that the crank angle θ measured by, for example, crank angle sensor 32 is greater than crank angle $\theta_2$ (Step 612: NO), controller 30 may proceed to step 616.

Method 600 may include a step of operating a second check valve member (Step 616). In step 616, controller 30 may energize solenoid 122 of fuel injector 26 or 128. Energizing solenoid 122 may cause control valve 118 to move from its first position to its second position, overcoming the biasing force exerted by biasing member 124. As discussed above, in its second position, control valve 118 may cause control chamber 76 of fuel injector 26 to be fluidly connected to drain outlet 68, which may reduce a pressure in control chamber 76 relative to a pressure of the fuel acting on check valve member 72 adjacent injection end 90. The high pressure adjacent injection end 90 may cause check valve member 72 to move along longitudinal axis 42 out of contact with nozzle seat 108, allowing a second flow of fuel to flow out of nozzle chamber 106 and into sac 96. The second flow of fuel may also flow out through the one or more orifices 82 into cylinder 16.

Similarly when controller 30 is configured to control fuel injector 128, when control valve 118 moves to its second position, control valve 118 may cause control chamber 182 of fuel injector 128 to be fluidly connected to drain outlet 68, which may reduce a pressure in control chamber 182 relative to a pressure of the fuel acting on check valve member 168 adjacent nozzle chamber end 162. The high pressure adjacent nozzle chamber end 162 may cause check valve member 168 to move out of contact with nozzle seat 190, allowing a second flow of fuel to flow out of nozzle chamber 152 and into nozzle chamber 150 and sac 154. The second flow of fuel may also flow out through the one or more orifices 82 into cylinder 16. Thus, in step 616, because both control valves 116 and 118 are energized, both the first and second flows of fuel may flow out of fuel injector 26 or 128 into cylinder 16. One of ordinary skill in the art would recognize that an amount of fuel being injected into cylinder 16 in step 616 may be larger than an amount of fuel injected into cylinder 16 in step 610.

Method 600 may include a step of determining whether crank angle θ is greater than crank angle "$\theta_3$" (Step 618). In step 618, controller 30 may perform functions similar to those discussed above with respect to, for example, step 606 to determine the crank angle θ. Controller may compare the determined value of crank angle θ with the threshold value θ₃, which may signify an end of fuel injection. When controller 30 determines that the crank angle θ measured by, for example, crank angle sensor 32 is less than or equal to crank angle θ₃ (Step 618: NO), controller 30 may proceed to step 620 of continuing to operate both the first check valve member and the second check valve member. In this step, controller 30 may continue to keep both solenoid 120 and solenoid 122 energized to allow both the first and the second flows of fuel to flow out of orifices 82 of fuel injector 26 or 128. When controller 30 determines, however, that the crank angle θ measured by, for example, crank angle sensor 32 is greater than crank angle θ₃ (Step 612: YES), controller 30 may proceed to step 622.

Method 600 may include a step of stopping fuel injection into cylinder 16 (Step 622). In step 622, controller 30 may be configured to de-energize both solenoids 120 and 122. De-energizing solenoids 120 and 122 may cause control valves 116 and 118 to return to their first positions due to the biasing force exerted by biasing member 124. Movement of control valves 116 and 118 to their first positions may block the connection between control chambers 74 and 76 and drain outlet 68. Because control chambers 74 and 76 may be also connected to fuel inlet 66, blocking the connection between control chambers 74 and 76 and drain outlet 68 may subject control chambers 74 and 76 to a pressure of common rail 28. This may cause check valve members 70 and 72 to move towards injection ends 86 and 90, respectively. As a result, check valve members 70 and 72 may sealingly come into contact with nozzle seats 102 and 108, respectively, and block the one or more orifices 82, stopping a flow of fuel from nozzle chamber 100 and nozzle chamber 106 into cylinder 16.

Similarly, when controller 30 is configured to control fuel injector 128, de-energizing solenoids 120 and 122 may block the connection between control chambers 178 and 182 and drain outlet 68. Because control chambers 178 and 182 may be also connected to fuel inlet 66 via passageways 174 and 176, blocking the connection between control chambers 178 and 182 and drain outlet 68 may subject control chambers 178 and 182 to a pressure of common rail 28. This may cause check valve members 156 and 168 to move towards injection end 160 and nozzle chamber end 162, respectively. As a result check valve members 156 and 168 may sealingly come into contact with nozzle seats 186 and 190, respectively, and block the one or more orifices 82 and passageway 164, stopping a flow of fuel from nozzle chamber 150 and nozzle chamber 152 into cylinder 16.

Figure 7:
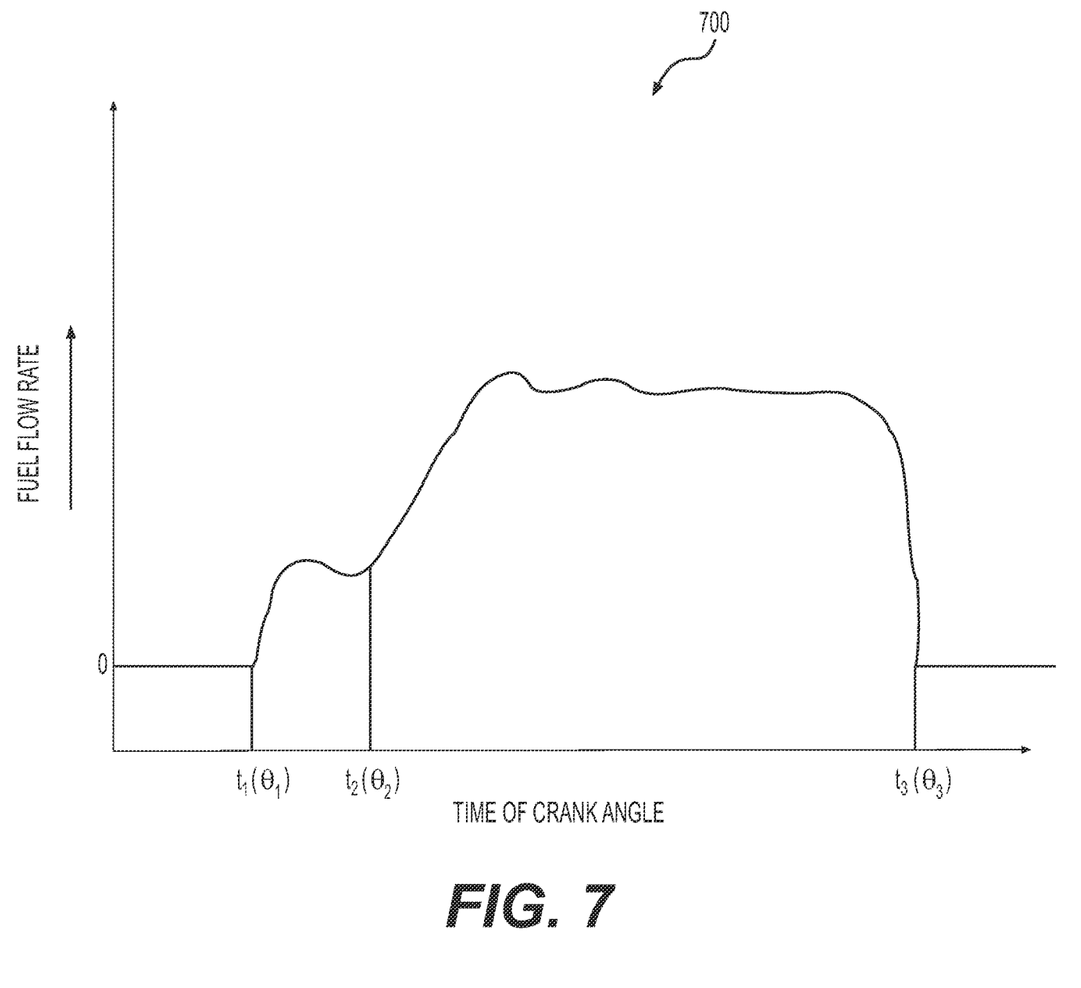
FIG. 7 is a chart illustrating an exemplary rate shape that may be obtained using the fuel injectors of FIGS. 2 and 4.

FIG. 7 illustrates an exemplary chart 700 showing a variation of the fuel flow rate through the one or more orifices 82 into cylinder 16 with time corresponding to method 600 described above. The chart of FIG. 7 may be sometimes referred to as illustrating a rate shape. As illustrated in FIG. 7, controller 30 may energize solenoid 120 at time t₁ (corresponding to crank angle θ₁). Controller 30 may maintain solenoid 122 in a de-energized state until time t₂ (corresponding to crank angle θ₂). At time t₂, controller 30 may energize solenoid 122 while also energizing solenoid 120, causing an increase in the rate of fuel flow into cylinder 16 as seen in FIG. 7. Controller 30 may de-energize solenoids 120 and 122 at time t₃ (corresponding to crank angle θ₃), which may cause the flow rate of fuel from the one or more orifices to reduce to zero. Thus, FIG. 7 shows an exemplary injection method in which a small amount of fuel is initially injected into cylinder 16 between time t₁ and t₂, and a much larger amount of fuel is injected into cylinder 16 between time t₂ and t₃. Introducing a smaller amount of fuel between times t₁ and t₂ in the initial stages of the combustion cycle may help reduce a temperature in cylinder 16, which in turn may help to reduce an amount of soot and/or NOₓ produced in cylinder 16 during combustion.

It is to be understood that method 600 and the corresponding rate shape illustrated in FIG. 7 may correspond to an exemplary method that may be performed by controller 30 and fuel system 20. It is contemplated that fuel injectors 26 or 128 may be operated in many different ways to alter the rate and amount of fuel injected into cylinder 16 during a combustion cycle. For example, in some exemplary embodiments, check valve members 70 or 156 may be operated at crank angles greater than θ₂, to inject additional fuel towards the end of a combustion cycle, to help in combusting soot produced during the combustion cycle. In other exemplary embodiments, both check valve members 70, 72, or 156, 168 may be operated between crank angles θ₁ and θ₂, and only check valve members 70 or 156 may be operated at angles greater than θ₂.

It will be apparent to those skilled in the art that various modifications and variations can be made to the disclosed fuel injector. Oher embodiments will be apparent to those skilled in the art from consideration of the specification and practice of the disclosed fuel injector. It is intended that the specification and examples be considered as exemplary only, with a true scope being indicated by the following claims and their equivalents.

What is claimed is:

1. A method of operating a fuel injector, including an injector body, a fuel inlet, and at least one orifice, the method comprising:
   pressurizing fuel;
   supplying the pressurized fuel to the fuel inlet;
   operating a first check valve member to fluidly connect the fuel inlet to the at least one orifice via a first passageway and a first nozzle chamber in the injector body;
   injecting a first amount of the fuel from the at least one orifice;
   operating a second check valve member to fluidly connect the fuel inlet to the at least one orifice via a second passageway and a second nozzle chamber in the injector body; and
   selectively injecting a second amount of the fuel from the at least one orifice;
   wherein the first check valve member is movable between a closed position where the first check valve member blocks a flow of fuel through the at least one orifice, and an open position where the first check valve member does not block a flow of fuel through the at least one orifice.

2. The method of claim 1, wherein injecting the first amount of the fuel includes:
   energizing a first solenoid to move a first control valve from a first position of the first control valve to a second position of the first control valve;
   connecting a first control chamber disposed at a base end of the first check valve member with a drain outlet of the fuel injector; and
   moving the first check valve member from the closed position in which the first check valve member is in contact with a first nozzle seat to the open position in which the first check valve member is out of contact with the first nozzle seat.

3. The method of claim 2, further including adjusting a pressure applied to the first check valve member by selectively operating the second check valve member.

4. The method of claim 3, wherein adjusting the pressure includes one of adjusting the pressure applied to the first check valve member adjacent the first nozzle seat of the first check valve member, adjusting the pressure applied to the first check valve member adjacent the first control chamber, or adjusting the pressure applied to the first check valve member at a location between the first control chamber and the first nozzle seat.

5. The method of claim 2, wherein injecting the second amount of the fuel includes:

energizing a second solenoid to move a second control valve from a first position of the second control valve to a second position of the second control valve;

connecting a second control chamber disposed at a second base end of the second check valve member with the drain outlet of the fuel injector; and moving the second check valve member from a second closed position in which the second check valve member is in contact with a second nozzle seat to a second open position in which the second check valve member is out of contact with the second nozzle seat.

6. The method of claim 5, further including:

energizing the first solenoid to move the first control valve from the first position of the first control valve to the second position of the first control valve at a first crank angle;

energizing the second solenoid to move the second control valve from the first position of the second control valve to the second position of the second control valve at a second crank angle;

maintaining the first and the second control valves in their respective second position until a third crank angle; and de-energizing the first solenoid and the second solenoid at the third crank angle.

7. The method of claim 1, further including operating the second check valve member after operating the first check valve member.

8. The method of claim 1 further comprising fluidly connecting the at least one nozzle orifice to a fuel passage formed by a clearance peripherally around the first check valve member and extending between a bore in the fuel injector and the first nozzle chamber.

9. The method of claim 8 further comprising supplying the fuel to be supplied to the first nozzle chamber and the fuel to be supplied to the second nozzle chamber from the bore, and each of the first check valve member and the second check valve member is within the bore.

10. The method of claim 1 further comprising choking a flow of the fuel through the fuel passage by way of an M-orifice.

11. The method of claim 1 wherein the first check valve member is spaced diametrically from the second check valve member in the fuel injector.

12. The method of claim 11 further comprising fluidly connecting the at least one orifice to a second fuel passage extending through the second seat between the first nozzle chamber and the second nozzle chamber.

13. The method of claim 1 further comprising starting the injection of the first amount of fuel at a first crank angle timing, and starting the injection of the second amount of fuel at a second crank angle timing.

14. The method of claim 13 wherein the first amount of fuel includes a smaller amount of fuel and the first crank angle timing includes an earlier crank angle timing, and wherein the second amount of fuel includes a larger amount of fuel and the second crank angle timing includes a later crank angle timing.

* * * * *